United States Patent
Bai et al.

(10) Patent No.: US 7,830,957 B2
(45) Date of Patent: Nov. 9, 2010

(54) PARALLEL BIT INTERLEAVER FOR A WIRELESS SYSTEM

(75) Inventors: Jinxia Bai, San Diego, CA (US); Thomas Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 983 days.

(21) Appl. No.: 11/416,853

(22) Filed: May 2, 2006

(65) Prior Publication Data

US 2007/0258532 A1 Nov. 8, 2007

(51) Int. Cl.
*H04B 1/66* (2006.01)
(52) U.S. Cl. .................. 375/240; 375/278; 375/285; 375/296; 714/756; 341/81
(58) Field of Classification Search ........... 375/146, 375/240, 261, 265, 262, 278, 285, 296; 708/200; 714/751, 756, 786; 341/31, 81, 82, 89
See application file for complete search history.

(56) References Cited

U.S. PATENT DOCUMENTS

| | | | | |
|---|---|---|---|---|
| 4,777,635 A | * | 10/1988 | Glover | 714/756 |
| 6,163,871 A | * | 12/2000 | Yang | 714/769 |
| 6,591,381 B1 | * | 7/2003 | Kim et al. | 714/701 |
| 7,091,889 B2 | * | 8/2006 | Kukla et al. | 341/81 |
| 7,219,173 B2 | * | 5/2007 | Sha et al. | 710/61 |
| 2004/0268207 A1 | | 12/2004 | Sharma | |
| 2005/0166127 A1 | | 7/2005 | Bacher et al. | |

FOREIGN PATENT DOCUMENTS

WO 03052997 6/2003

OTHER PUBLICATIONS

Giulietti, A., et al., "Parallel Turbo Coding Interleavers: Avoiding Collisions in Accesses to Storage Elements," Electronics Letters, IEE Stevenage, GB, vol. 38, No. 5, Feb. 28, 2002, pp. 232-234, XP006018151, ISSN: 0013-5194.
International Search Report—PCT/US07/068003, International Search Authority—European Patent Office—Oct. 19, 2007.
Written Opinion—PCT/US07/068003, International Search Authority—European Patent Office—Oct. 19, 2007.

* cited by examiner

*Primary Examiner*—Dac V Ha
(74) *Attorney, Agent, or Firm*—Gerald P. Joyce, III

(57) ABSTRACT

Systems and methods are provided to process wireless data packets. A method includes determining a subset of data bits to be processed at a wireless transmitter and employing a clock edge to store the data. The clock edge allows parallel mapping of at least two bits from the subset of data bits into an interleaver memory per a given clock edge. From the memory, other encoding and scrambling processes are applied before transmitting the data packets across a wireless network.

41 Claims, 10 Drawing Sheets

PARALLEL BIT INTERLEAVER FOR A WIRELESS SYSTEM

BACKGROUND

I. Field

The subject technology relates generally to communications systems and methods, and more particularly to systems and methods for a forward link only wireless system where transmission data subsets are interleaved in parallel groupings per clock cycle.

II. Background

An air interface specification defines FLO (Forward Link Only) technology that has been developed by an industry-led group of wireless providers. In general, FLO has leveraged the most advantageous features of wireless technologies available and used the latest advances in coding and system design to consistently achieve the highest-quality performance. One goal is for FLO to be a globally adopted standard.

The FLO technology was designed in one case for a mobile multimedia environment and exhibits performance characteristics suited ideally for use on cellular handsets. It uses the latest advances in coding and interleaving to achieve the highest-quality reception at all times, both for real-time content streaming and other data services. FLO technology can provide robust mobile performance and high capacity without compromising power consumption. The technology also reduces the network cost of delivering multimedia content by dramatically decreasing the number of transmitters needed to be deployed. In addition, FLO technology-based multimedia multicasting complements wireless operators' cellular network data and voice services, delivering content to the same cellular handsets used on 3G networks.

The FLO wireless system has been designed to broadcast real time audio and video signals, apart from non-real time services to mobile users. The respective FLO transmission is carried out using tall and high power transmitters to ensure wide coverage in a given geographical area. Further, it is common to deploy 3-4 transmitters in most markets to ensure that the FLO signal reaches a significant portion of the population in a given market. During the acquisition process of a FLO data packet several determinations and computations are made to determine such aspects as frequency offsets for the respective wireless receiver. Given the nature of FLO broadcasts that support multimedia data acquisitions, efficient processing of such data and associated overhead information is paramount. For instance, when determining frequency offsets or other parameters, complex processing and determinations are required where determinations of phase and associated angles are employed to facilitate the FLO transmission and reception of data.

Wireless communication systems such as FLO employ various data processing algorithms and state machine processes when transmitting a data packet from transmitter to receiver. One process involves mapping bits received from a transmitter encoder to one or more patterns associated with differing constellation symbols. In general, a serial process is employed for arranging bit streams into desired patterns for transmission. Such serial processes are generally state-driven where edges of a high-speed clock drive the next mapping of bits into a respective pattern for later transmission. Currently, such mapping algorithms allow one bit to be placed into the respective pattern per clock edge (i.e., rising or falling). Although this serial process has been effective, mapping a single bit per clock edge is inefficient and consumes valuable processing resources. In view of the fact that a typical FLO transmission packet can involve hundreds of bits, this inefficiency can be significant.

SUMMARY

The following presents a simplified summary of various embodiments in order to provide a basic understanding of some aspects of the embodiments. This summary is not an extensive overview. It is not intended to identify key/critical elements or to delineate the scope of the embodiments disclosed herein. Its sole purpose is to present some concepts in a simplified form as a prelude to the more detailed description that is presented later.

Systems and methods are provided for performing parallel interleaving processes in a forward link only (FLO) transmitter. Bits from an encoder are received by a parallel bit interleaver component where the respective bits are processed in multiples per clock event to facilitate efficient data processing at the transmitter. For instance, groupings of two bits, four bits, or other even multiples are mapped in parallel and per clock event to a constellation buffer which is further processed before transmitting data to a wireless network. Rather than mapping singular bits per clock event, the parallel bit interleaver processes data in multiples to increase data throughput at the transmitter. The interleaved packet that has been processed by the interleaver component can be read out immediately after the last bit of the packet has been written to an interleaving memory or buffer allowing the whole bit interleaving latency to be reduced by at least half depending on the groupings of bits that are selected to be processed in parallel. Other features include dynamic adjustments depending on the number of bits in a packet to be processed. For packets that are divisible by eight for example, relatively straight-forward processing can be employed to map groupings of bits for later transmission. For packets that are not divisible by eight, for example a typical FLO packet may include 1500 bits alternative processing paths can be enabled to allow effective and efficient parallel bit processing at the transmitter.

To the accomplishment of the foregoing and related ends, certain illustrative embodiments are described herein in connection with the following description and the annexed drawings. These aspects are indicative of various ways in which the embodiments may be practiced, all of which are intended to be covered.

DETAILED DESCRIPTION

Systems and methods are provided to process wireless data packets. A method includes determining a subset of data bits to be processed at a wireless transmitter and employing a clock edge to store the data. The clock edge allows parallel mapping of at least two bits from the subset of data bits into an interleaver memory per a given clock edge. From the memory, other encoding and scrambling processes are applied before transmitting the data packets across a wireless network. Depending on the nature of the data packets (e.g., whether the data packets are evenly divisible by a predetermined number), dynamic processing considerations may be applied when performing the mapping.

As used in this application, the terms "component," "network," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate over local and/or remote processes such as in accordance with a signal having one or more data packets (e.g., data from one component interacting with another component in a local system, distributed system, and/or across a wired or wireless network such as the Internet).

Figure 1:
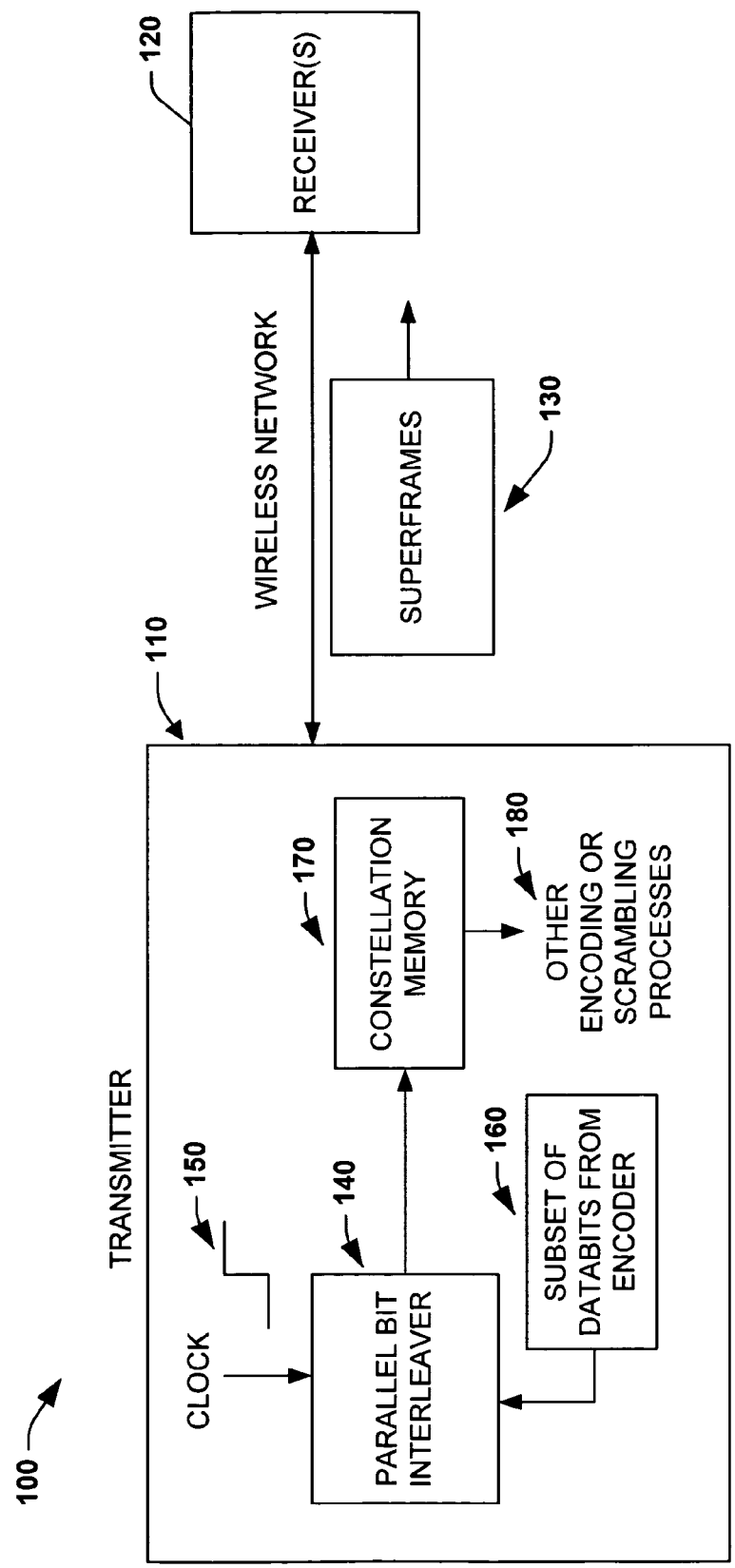
FIG. 1 is a schematic block diagram illustrating a parallel bit interleaver for a wireless system.

FIG. 1 illustrates a wireless network system 100 that employs parallel bit interleaving to facilitate efficient transmitter data processing. The system 100 includes one or more transmitters 110 that communicate across a wireless network to one or more receivers 120. The receivers 120 can include substantially any type of communicating device such as a cell phone, computer, personal assistant, hand held or laptop devices, and so forth. Portions of the receiver 120 are employed to decode a symbol subset 130 and other data such as multimedia data. The symbol subset 130 is generally transmitted in an Orthogonal Frequency Division Multiplexing (OFDM) network that employs forward link only (FLO) protocols for multimedia data transfer, wherein such protocols are described in more detail below. The transmitter 110 includes a parallel bit interleaver 140 that is driven from a clock source 150, where it is to be appreciated that rising or falling edges from the clock source can be employed to drive the interleaver.

A subset of data bits 160 are received from an encoder (not shown) and processed by the parallel bit interleaver 140, where output from the interleaver is mapped to a constellation memory or buffer 170. In general, bits from the encoder at 160 are received and processed by the parallel bit interleaver 140 where the respective bits are processed in multiples per clock source event at 150 to facilitate efficient data processing at the transmitter 110. For example, groupings of two bits, four bits, six bits, eight bits, or other even multiples from the data subset 160 are mapped in parallel and per clock event to the constellation memory 170 which can be further processed before transmitting data to the wireless network. Processing from the constellation memory 170 can include further encoding or scrambling operations as illustrated at 180.

Rather than mapping singular bits per clock source event at 150, the parallel bit interleaver 140 processes data in multiples to increase data throughput at the transmitter 110. The interleaved packets that are processed by the interleaver 140 can be read out immediately after the last bit of the packet has been written to the interleaving memory or buffer 170 allowing the whole bit interleaving latency to be reduced by at least half depending on the groupings of bits at 160 that are selected to be processed in parallel. Other features which are described in more detail below, include dynamic state machine adjustments depending on the number of bits in a packet to be processed. For packets that are divisible by eight for example, relatively straight-forward processing can be employed to map groupings of bits at 170 for later transmission. For packets that are not divisible by eight, for example a typical FLO packet may include 1500 bits alternative processing paths can be enabled to allow effective and efficient parallel bit processing at the transmitter. As will be described in more detail below, the parallel bit interleaver 140 can be provided as part of a state machine where respective state of the machine are transitioned form rising or falling edges of the clock source 150. The system 100 can include a component for processing transmitter data in a wireless network. This includes means for encoding a data packet (e.g., transmitter 110), means for interleaving the data packet on a shared clock cycle (e.g., parallel bit interleaver 140); and means for mapping the data packet to a constellation (e.g., memory 170) for employment in a wireless transmission.

Before proceeding, some basic wireless transmission concepts are provided. For wireless transmission, on transmitted packet structure can include an OFDM symbol that consists of 4642 time-domain base-band samples called OFDM chips. Among these OFDM chips are 4096 data and pilot chips, originating from 4096 data and pilot subcarriers in the frequency domain. These chips can be cyclically extended, with 529 chips preceding the useful portion and 17 following the useful portion. To reduce the OFDM signal's out-band energy, the first 17 chips and the last 17 chips in an OFDM symbol have a raised cosine envelope. The first 17 chips of an OFDM symbol overlap with the last 17 chips of the OFDM symbol that precede them. As a result, the time duration of each OFDM symbol can be 4625 chips long.

In one transmission data packet example, data can be generally organized into super frames 130, where each super frame has a one second duration. The super frame 130 generally consists of 1200 symbols that are OFDM modulated with 4096 sub-carriers. With respect to sub-carriers, an interlace refers to a subset of sub-carriers spaced by a certain amount (e.g., spacing of 8). For example, 4096 sub-carriers could be divided into 8 interlaces, where the subcarriers in the $i^{th}$ interlace are those with indices 8k+i. Among the various OFDM symbols in the super frame 130, there typically are: Two TDM pilot symbols (TDM1, TDM2); One wide-area and one local identification channel (WIC and LIC) symbols; Fourteen overhead information symbols (OIS) channel symbols; A variable number of two, six, 10, or 14 pilot positioning symbols (PPC) symbols for assisting with position location; A certain number of Transitional Pilot Channel (TPC) symbols, or TDM 3 pilots, which are located on each boundary between wide-area and local content data; and the remaining symbols are used for broadcast of either wide-area or local area waveform. Each super frame 130 generally consists of four data frames, as well as overhead symbols.

Time Division Multiplexing (TDM) Pilot Symbol 1 (TDM1) is the first OFDM symbol of each super frame, where TDM1 is periodic and has a 128 OFDM chip period. The receiver uses TDM1 for frame synchronization and initial time (course timing) and frequency acquisition. Following TDM1, are two symbols that carry the wide-area and local IDs, respectively. The receiver uses this information to perform proper descrambling operations for the corresponding content, utilizing the corresponding PN sequences. Time division Multiplexing pilot Symbol 2 (TDM2) follows the wide-area and local ID symbols, where TDM2 is periodic, having a 2048 OFDM chip period, and contains two and a fraction periods. The receiver uses TDM2 when determining accurate timing for demodulation of the OIS channel.

Following TDM2 are: One wide-area TPC (WTPC) symbol; Five wide-area OIS symbols; Another WTPC; One local TPC (LTPC) symbol; Another LTPC; and Four data frames follow the first 18 OFDM symbols described above. A data frame is typically subdivided into a wide-area data portion and a local data portion. The wide-area waveform is prepended and appended with the wide-area TPC—one on each end. This arrangement is also used for the local data portion.

Figure 2:
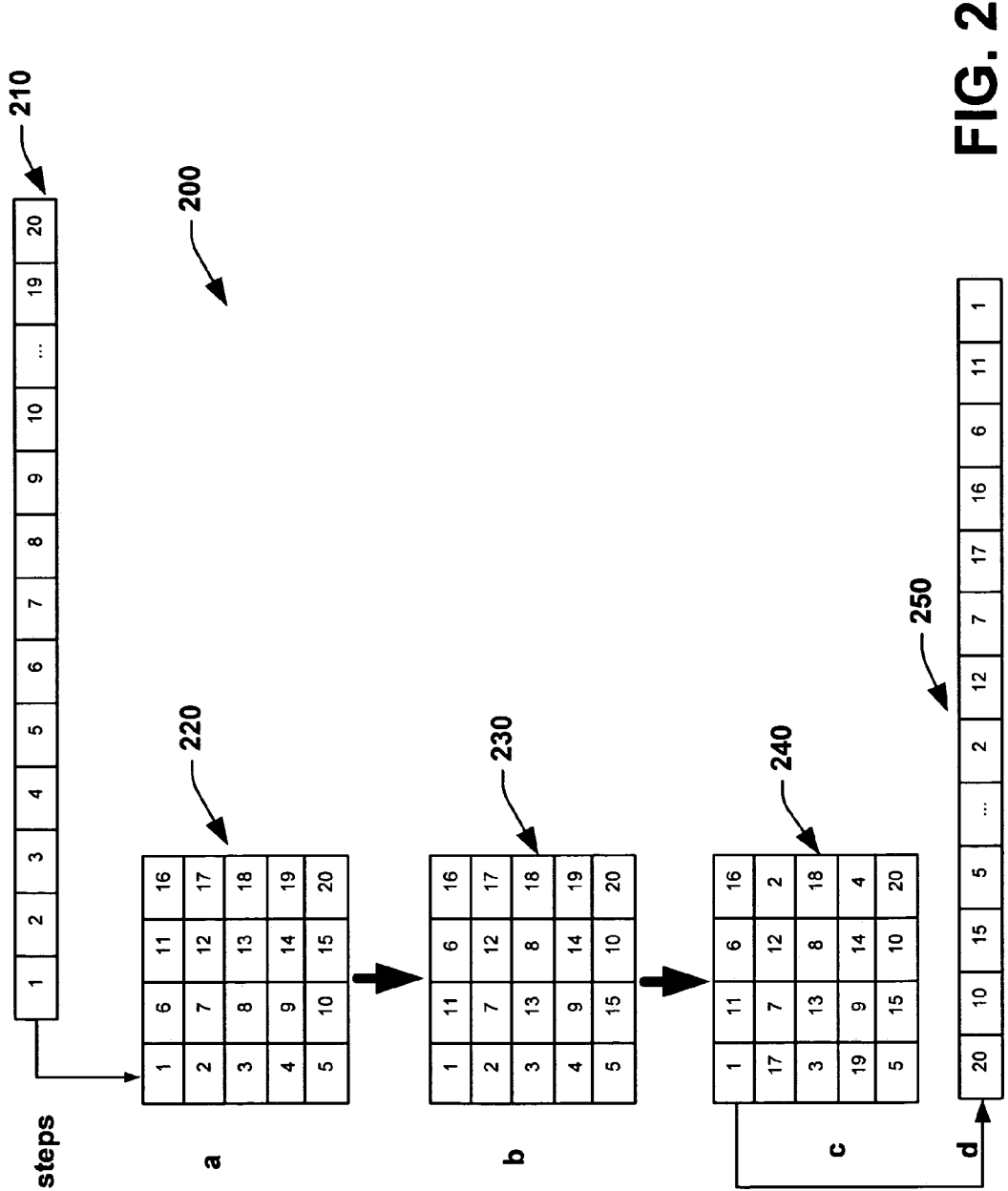
FIG. 2 illustrates example parallel bit interleaver processing considerations.

FIG. 2 illustrates example parallel bit interleaver processing considerations 200. Before proceeding, it is noted that the example 200 shows processing of a 20 bit data packet. It is to be appreciated however that substantially any number of bits can be processed with the parallel bit interleaver concepts described herein. In general, an input packet of 20 bits is illustrated at 210. Generally, four stages of processing are provided shown as stages a though d at reference numerals 220-250, respectively.

For an Overhead Information Symbol (OIS) Channel and an associated Data Channel, bit interleaving is generally a form of block interleaving. The code bits of a turbo encoded packet are interleaved in such a pattern that adjacent code bits are mapped into different constellation symbols as shown at 220-250. The Bit Interleaver should reorder the turbo encoded bits per following procedure:

At 220:
 a. For N bits to be interleaved, the bit interleaver matrix M should be a 4 columns by N/4 rows block interleaver. The N input bits should be written into the interleaving array column-by-column sequentially. Label the rows of the matrix M by index j, where j=0 through N/4−1 and row 0 is the first row.

At 230:
 b. For every row j, with even index (j mod 2=0), the elements in the 2nd and the 3rd column should be interchanged.

At 240:
 c. For every row with odd index (j mod 2!=0), the elements in the 1st and the 4th column should be interchanged.

At 250:
 d. Denote the resulting matrix by $\overline{M}$. The contents of $\overline{M}$ should be read out row-wise, from left to right.

By employing parallel implementation, where the bits at 210 are mapped at least two per clock cycle, the interleaved turbo packet at 250 can be read out quickly after the last bit of the packet has been written to the interleaving memory at 250 and thus, the whole bit interleaving latency can be reduced by at least half if two bits are mapped per clock cycle. As noted above, more than two bits in even multiple groupings can be mapped for greater processing efficiency.

Figure 3:
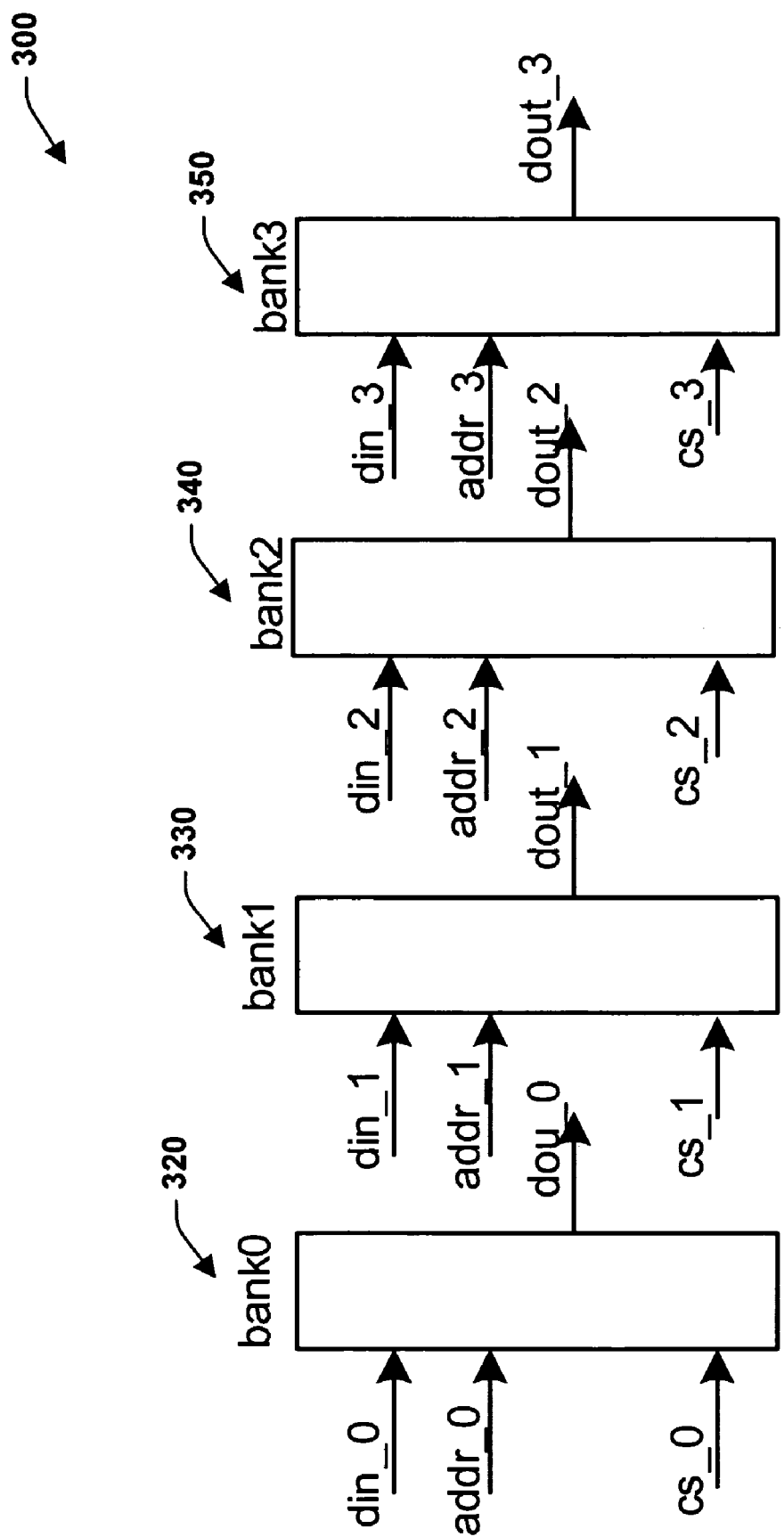
FIG. 3 illustrates and example parallel bit interleaving buffer.
Figure 4:
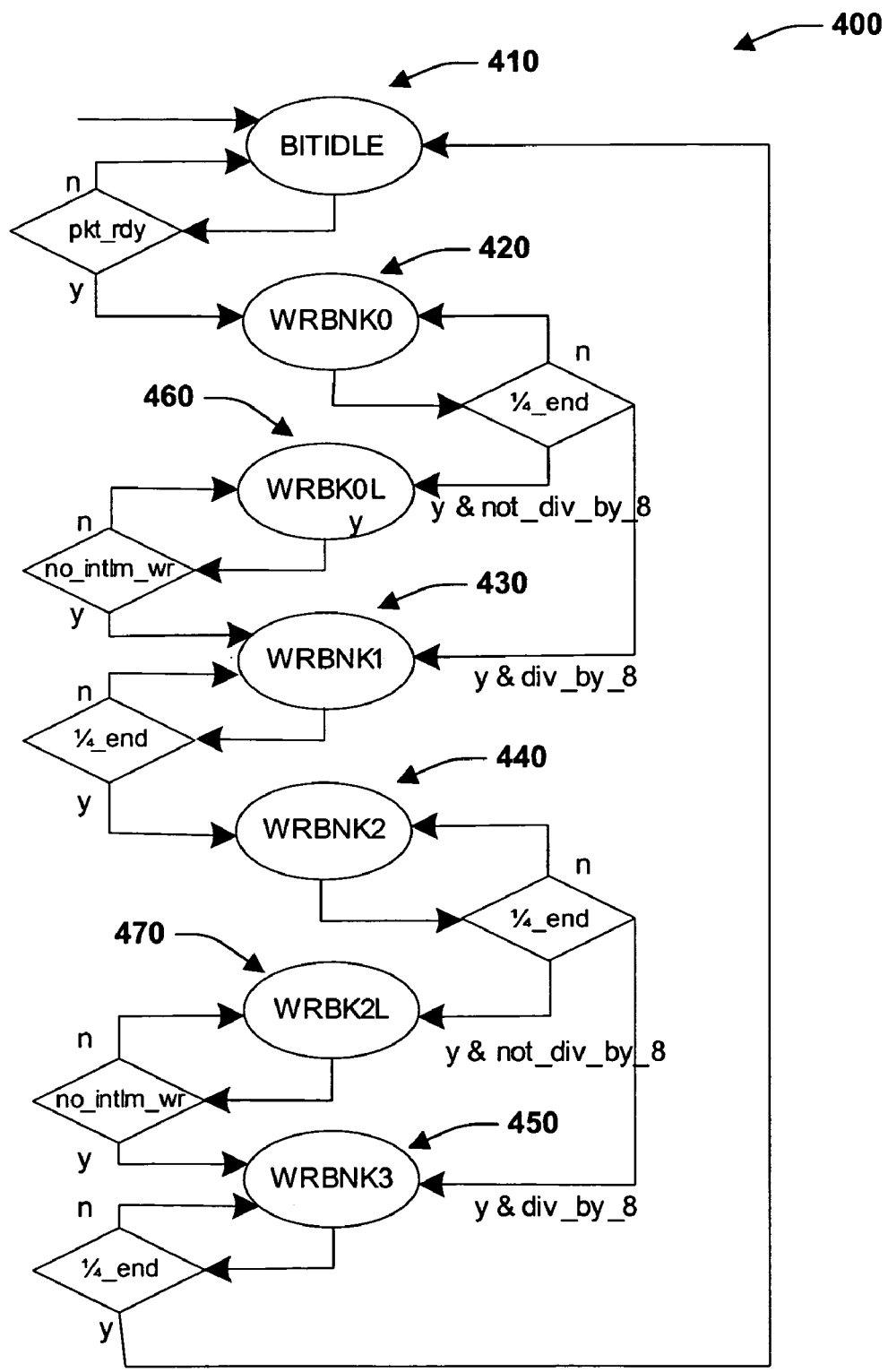
FIG. 4 illustrates an example parallel bit interleaving state machine process.

FIG. 3 illustrates and example parallel bit interleaving buffer 300. Four processing banks are shown at 320-350 but it is to be appreciated that other configurations are possible (e.g., 8 banks). As shown, a bank 0 is at 320, bank 1 at 330, bank 2, at 340, and bank 3 at 350, where the respective banks include a data input (e.g., din_0), and address input (e.g., addr_0), and a chip select input (e.g., cs_0). Parallel bit interleaving can be achieved by hopping the address supplied to the respective banks when writing to the bit interleaving memory. A state machine and a counter can be employed to generate the address. The interleaving memory structure is shown as the buffer 300 including banks 320-350 and the state machine is shown in FIG. 4. Generally, this processing scheme works for all different turbo packet lengths which are dividable by four. The bit interleaving memory has four banks, bank0, bank1, bank2, and bank3 at 320-350 respectively. Thus, each bank of the interleaving memory is ¼ of one turbo packet length deep and 1 bit wide. These four banks 320-350 can be written or read at the same time, if desired. To perform bit interleaving, write two banks per clock cycle in adjacent address locations. When reading out, read four banks per each clock cycle in the same address space.

Figure 5:
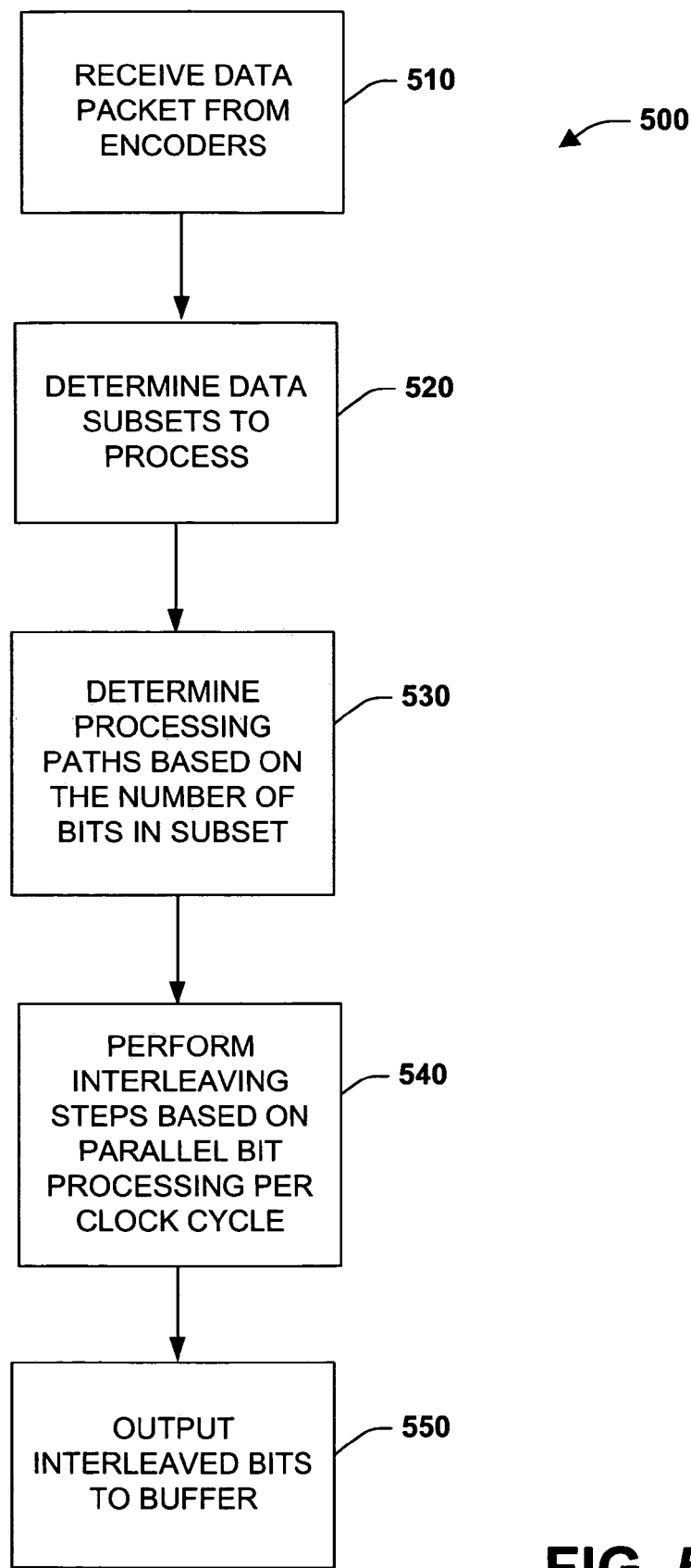
FIG. 5 illustrates an example bit interleaving process.

FIGS. 4 and 5 illustrate an example parallel bit processing for a wireless transmitter. While, for purposes of simplicity of explanation, the methodologies are shown and described as a series or number of acts, it is to be understood and appreciated that the processes described herein are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the subject methodologies disclosed herein.

FIG. 4 illustrates an example parallel bit interleaving state machine process 400. The bit interleaving state machine 400 can be in a BITIDLE state 410 until a new turbo packet arrives from an encoder. The interleaver engine writes to the bit interleaving memory about /1;4 of the length of the turbo packet in states WRBNK0 at 420, WRBNK1 430, WRBNK2 440, and WRBNK3 450 separately. States WRBK0L 460 and WRBK2L 470 are special interleaving states or cases for those packets with the length not dividable by 8, such as rate ⅔ case, for example.

At 420, WRBNK0: write bank0 and bank3 at the same clock cycle and adjacent address. For divide_by_8 packet the address sequences are e.g., (0 1), (2 3), (4 5) . . . (N/4−2 N/4−1). For not_divide_by_8 packets the address sequences are e.g., (0 1), (2 3), (4 5) . . . (N/4−3 N/4−2).

At 430, WRBNK1: write bank1 and bank2 at the same clock cycle and adjacent address. For divide_by_8 packet the address sequences are e.g., (1 0), (3 2), (5 4) . . . (N/4−1 N/4−2). For not divide_by_8 packets the address sequences are e.g., (1 2), (3 4), (5 6) . . . (N/4−2 N/4−1).

At 440, WRBNK2: write bank1 and bank2 at the same clock cycle and adjacent address. For divide_by_8 packet the address sequences are e.g., (0 1), (2 3), (4 5) . . . (N/4−2 N/4−1). For not divide_by_8 packets the address sequence are e.g., (0 1), (2 3), (4 5) . . . (N/4−3 N/4−2).

At 450, WRBNK3: write bank0 and bank3 at the same clock cycle and adjacent address. For divide_by_8 packets the address sequences are e.g., (1 0), (3 2), (5 4) . . . (N/4−1 N/4−2). For not_divide_by_8 packets the address sequence are e.g., (1 2), (3 4), (5 6) . . . (N/4−2 N/4−1).

At 460, WRBK0L: write the last bit in bank0 and the first bit in bank2. For not_divide_by_8 packet only. (N/4−1 0).

At 470, WRBK2L: write the last bit in bank1 and the first bit in bank3. For not_divide_by_8 packet only. (N/4−1 0). As noted above, the parallel implementation depicted by the state machine process 400 reduces latency by at least half and not limited by the turbo packet size. Other efficiencies can be gained by processing more than two bits in parallel as can be appreciated.

FIG. 5 illustrates an example bit interleaving process 500. Proceeding to 510, a subset of data bits are received from a wireless transmitter encoder. Such encode bits could be generated as part of a forward link only or other OFDM transmission. At 520, the type of data subsets to be processed is determined. For example, in a 2-bit architecture, every two bits from the data subset at 510 will be processed in parallel per a respective clock cycle. As noted above, other data groupings can be employed if desired such as 4-bit groupings or 8-bit groupings, for example. At 530, the number of processing paths or state machine cycles are determined. For example, on a data subset that is evenly divisible by 8, fewer processing steps can be employed since special processes do not need reserved for bit arrangements that do not fall on such even boundaries (e.g., 20 bits, 1500 bits). If non-divisible by 8 data groupings are employed, additional processing steps can be used as illustrated above at steps 460 and 470 of FIG. 4. At 540, interleaving operations are performed in parallel based upon transitions of a clock. At least two bits are processed in parallel via the interleaving process as noted above. At 550, output from the interleaving process is written to a buffer where these bits are subsequently scrambled and transmitted across a wireless network from the transmitter.

Figure 6:
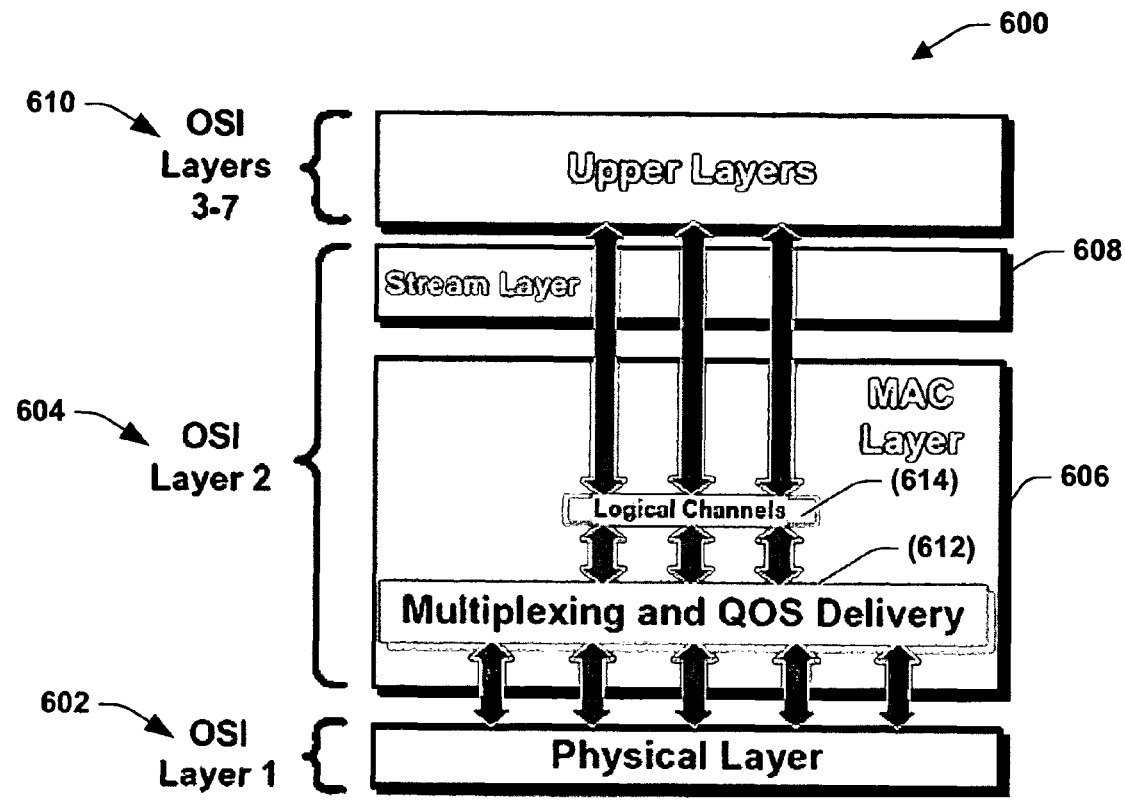
FIG. 6 is a diagram illustrating example network layers for a wireless system.

FIG. 6 illustrates example network layers 600 for a wireless system. A Forward Link Only (FLO) air interface protocol reference model is shown in FIG. 6. Generally, the FLO air interface specification covers protocols and services corresponding to Open Systems Interconnect (OSI) networking model having Layers 1 (physical layer) 602 and Layer 2 (Data Link layer) 604. The Data Link layer is further subdivided into two sub-layers, namely, Medium Access (MAC) sub-layer 606, and Stream sub-layer 608. Upper Layers 610 include OSI layers 3-7 and can include compression of multimedia content, access control to multimedia, along with content and formatting of control information. The MAC layer 606 includes multiplexing and Quality of Service (QoS) delivery functions 612. The MAC layer 606 also includes logical channels 614.

The FLO air interface specification typically does not specify the upper layers to allow for design flexibility in support of various applications and services. These layers are shown to provide context. The Stream Layer includes multiplexes up to three upper layer flows into one logical channel, binding of upper layer packets to streams for each logical channel, and provides packetization and residual error handling functions. Features of the Medium Access Control (MAC) Layer includes controls access to the physical layer, performs the mapping between logical channels and physical channels, multiplexes logical channels for transmission over the physical channel, de-multiplexes logical channels at the mobile device, and/or enforces Quality of Service (QOS) requirements. Features of Physical Layer include providing channel structure for the forward link, and defining frequency, modulation, and encoding requirements In general, FLO technology utilizes Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). Generally, OFDM technology can achieve high spectral efficiency while effectively meeting mobility requirements in a large cell SFN. Also, OFDM can handle long delays from multiple transmitters with a suitable length of cyclic prefix; a guard interval added to the front of the symbol (which is a copy of the last portion of the data symbol) to facilitate orthogonality and mitigate inter-carrier interference. As long as the length of this interval is greater than the maximum channel delay, reflections of previous symbols are removed and the orthogonality is preserved.

Figure 7:
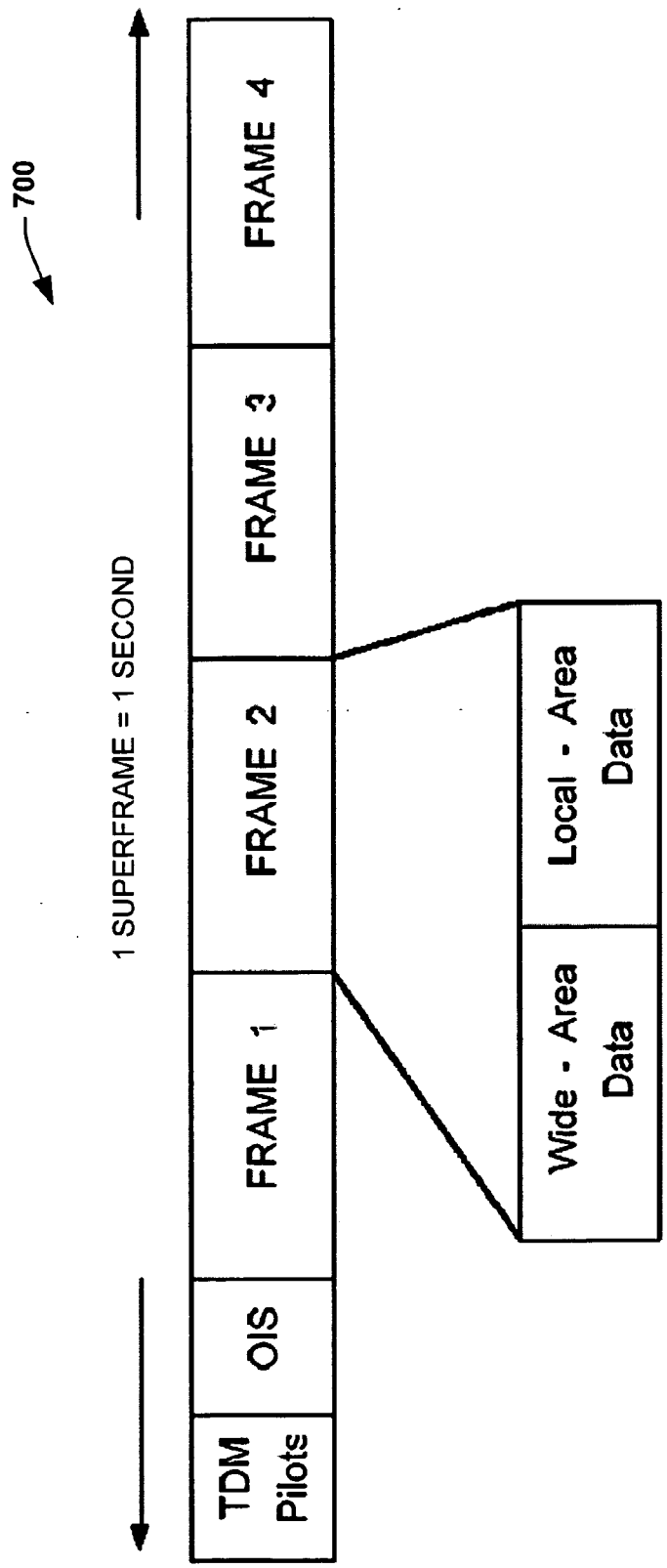
FIG. 7 is a diagram illustrating an example data structure and signal for a wireless system.

Proceeding to FIG. 7, a FLO physical layer 700 is illustrated. The FLO physical layer uses a 4K mode (yielding a transform size of 4096 sub-carriers), providing superior mobile performance compared to an 8K mode, while retaining a sufficiently long guard interval that is useful in fairly large single frequency network (SFN) cells. Rapid channel acquisition can be achieved through an optimized pilot and interleaver structure design. The interleaving schemes incorporated in the FLO air interface facilitate time diversity. The pilot structure and interleaver designs optimize channel utilization without annoying the user with long acquisition times. Generally, FLO transmitted signals are organized into super frames as illustrated at 700. Each super frame is comprised of four frames of data, including TDM pilots (Time Division Multiplexed), Overhead Information Symbols (OIS) and frames containing wide-area and local-area data. The TDM pilots are provided to allow for rapid acquisition of the OIS. The OIS describes the location of the data for each media service in the super frame.

Typically, each super frame consists of 200 OFDM symbols per MHz of allocated bandwidth (1200 symbols for 6 MHz), and each symbol contains 7 interlaces of active sub-carriers. Each interlace is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Error correction and coding techniques can also be employed. Generally, FLO incorporates a turbo inner code 13 and a Reed Solomon (RS) 14 outer code. Typically, the turbo code packet contains a Cyclic Redundancy Check (CRC). The RS code need not be calculated for data that is correctly received, which, under favorable signal conditions, results in additional power savings. Another aspect is that the FLO air interface is designed to support frequency bandwidths of 5, 6, 7, and 8 MHz. A highly desirable service offering can be achieved with a single Radio Frequency channel.

Figure 8:
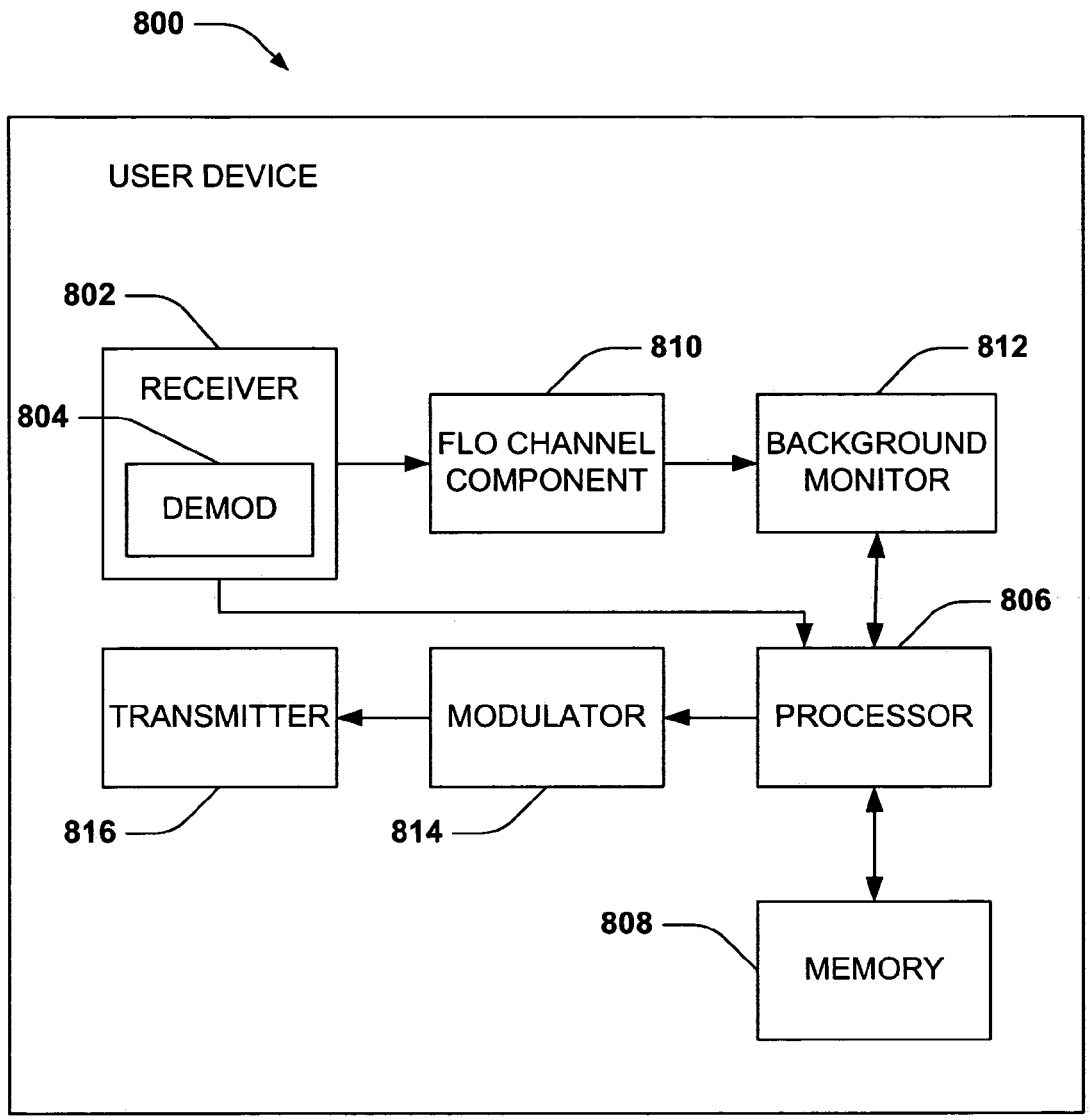
FIG. 8 is a diagram illustrating an example user device for a wireless system.

FIG. 8 is an illustration of a user device 800 that is employed in a wireless communication environment, in accordance with one or more aspects set forth herein. User device 800 comprises a receiver 802 that receives a signal from, for instance, a receive antenna (not shown), and performs typical actions thereon (e.g., filters, amplifies, down converts, etc.) the received signal and digitizes the conditioned signal to obtain samples. Receiver 802 can be a non-linear receiver. A demodulator 804 can demodulate and provide received pilot symbols to a processor 806 for channel estimation. A FLO channel component 810 is provided to process FLO signals as previously described. This can include digital stream processing. Processor 806 can be a processor dedicated to analyzing information received by receiver 802 and/or generating information for transmission by a transmitter 816, a processor that controls one or more components of user device 800, and/or a processor that both analyzes information received by receiver 802, generates information for transmission by transmitter 816, and controls one or more components of user device 800.

User device 800 can additionally comprise memory 808 that is operatively coupled to processor 806 and that stores information related to wireless network data processing. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and methods is intended to comprise, without being limited to, these and any other suitable types of memory. User device 800 further comprises a background monitor 814 for processing FLO data, a symbol modulator 814 and a transmitter 816 that transmits the modulated signal.

Figure 9:
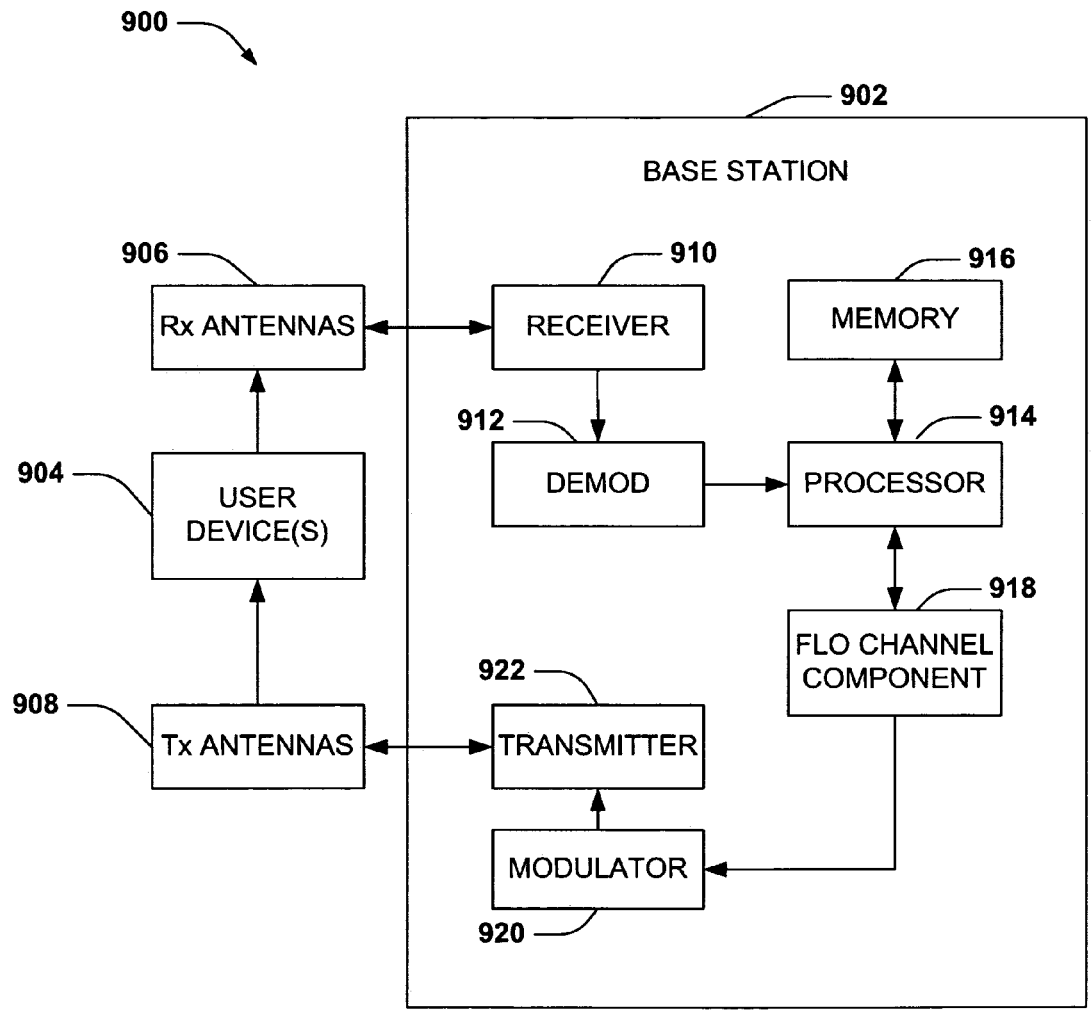
FIG. 9 is a diagram illustrating an example base station for a wireless system.

FIG. 9 is an illustrates an example system 900 that comprises a base station 902 with a receiver 910 that receives signal(s) from one or more user devices 904 through a plurality of receive antennas 906, and a transmitter 924 that transmits to the one or more user devices 904 through a transmit antenna 908. Receiver 910 can receive information from receive antennas 906 and is operatively associated with a demodulator 912 that demodulates received information. Demodulated symbols are analyzed by a processor 914 that is similar to the processor described above, and which is coupled to a memory 916 that stores information related to wireless data processing. Processor 914 is further coupled to a FLO channel 918 component that facilitates processing FLO information associated with one or more respective user devices 904.

A modulator 922 can multiplex a signal for transmission by a transmitter 924 through transmit antenna 908 to user devices 904. FLO channel component 918 can append information to a signal related to an updated data stream for a given transmission stream for communication with a user device 904, which can be transmitted to user device 904 to provide an indication that a new optimum channel has been identified and acknowledged.

Figure 10:
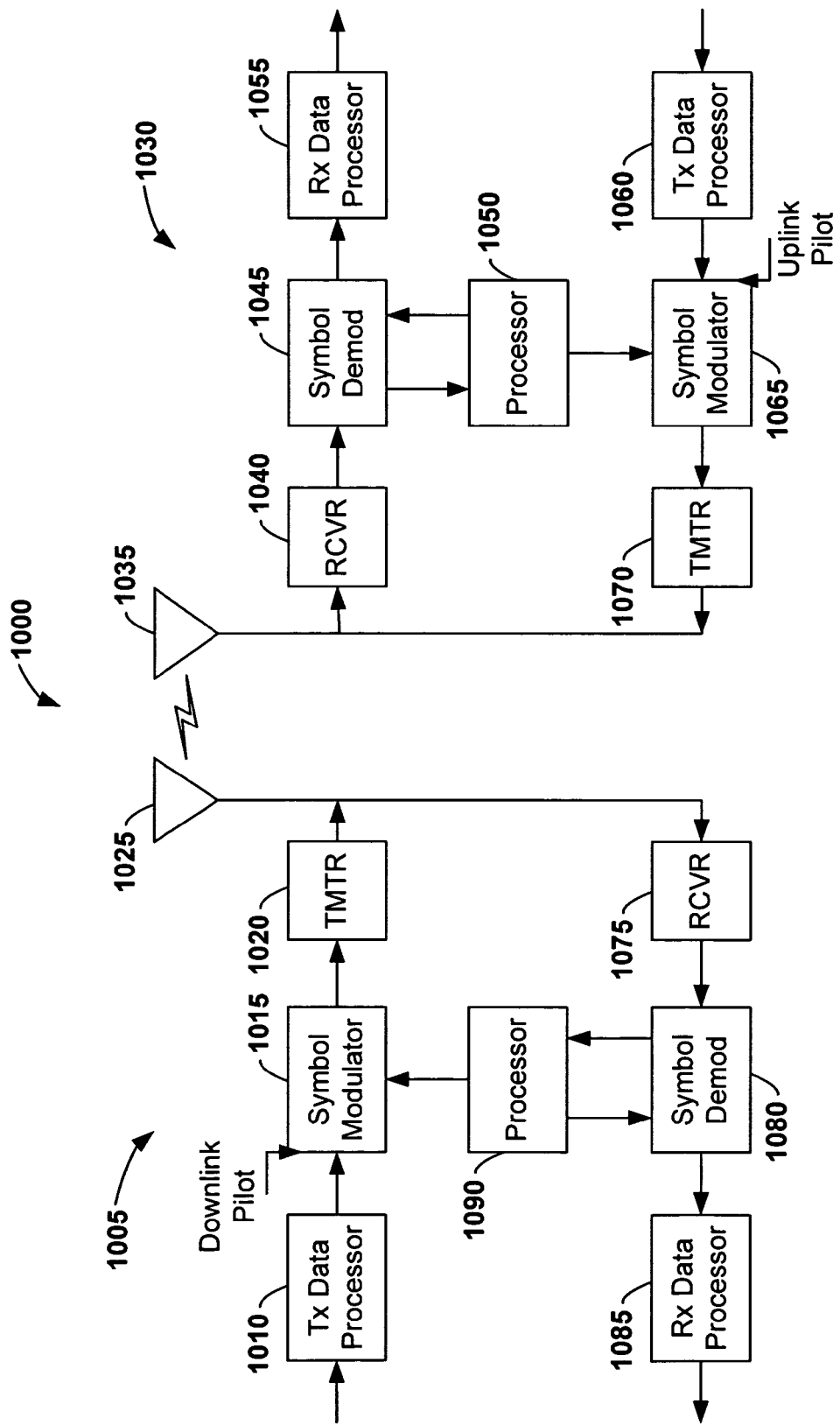
FIG. 10 is a diagram illustrating an example wireless transmitter and receiver system.

FIG. 10 shows an exemplary wireless communication system 1000. The wireless communication system 1000 depicts one base station and one terminal for sake of brevity. However, it is to be appreciated that the system can include more than one base station and/or more than one terminal, wherein additional base stations and/or terminals can be substantially similar or different for the exemplary base station and terminal described below.

Referring now to FIG. 10, on a downlink, at access point 1005, a transmit (TX) data processor 1010 receives, formats, codes, interleaves, and modulates (or symbol maps) traffic data and provides modulation symbols ("data symbols"). A symbol modulator 1015 receives and processes the data symbols and pilot symbols and provides a stream of symbols. A symbol modulator 1020 multiplexes data and pilot symbols and provides them to a transmitter unit (TMTR) 1020. Each transmit symbol may be a data symbol, a pilot symbol, or a signal value of zero. The pilot symbols may be sent continuously in each symbol period. The pilot symbols can be frequency division multiplexed (FDM), orthogonal frequency division multiplexed (OFDM), time division multiplexed (TDM), frequency division multiplexed (FDM), or code division multiplexed (CDM).

TMTR 1020 receives and converts the stream of symbols into one or more analog signals and further conditions (e.g., amplifies, filters, and frequency up converts) the analog signals to generate a downlink signal suitable for transmission over the wireless channel. The downlink signal is then transmitted through an antenna 1025 to the terminals. At terminal 1030, an antenna 1035 receives the downlink signal and provides a received signal to a receiver unit (RCVR) 1040. Receiver unit 1040 conditions (e.g., filters, amplifies, and frequency down converts) the received signal and digitizes the conditioned signal to obtain samples. A symbol demodulator 1045 demodulates and provides received pilot symbols to a processor 1050 for channel estimation. Symbol demodulator 1045 further receives a frequency response estimate for the downlink from processor 1050, performs data demodulation on the received data symbols to obtain data symbol estimates (which are estimates of the transmitted data symbols), and provides the data symbol estimates to an RX data processor 1055, which demodulates (i.e., symbol de-maps), de-interleaves, and decodes the data symbol estimates to recover the transmitted traffic data. The processing by symbol demodulator 1045 and RX data processor 1055 is complementary to the processing by symbol modulator 1015 and TX data processor 1010, respectively, at access point 1005.

Processors 1090 and 1050 direct (e.g., control, coordinate, manage, etc.) operation at access point 1005 and terminal 1030, respectively. Respective processors 1090 and 1050 can be associated with memory units (not shown) that store program codes and data. Processors 1090 and 1050 can also perform computations to derive frequency and impulse response estimates for the uplink and downlink, respectively.

Systems and devices described herein may be implemented in hardware, software, or a combination thereof. For a hardware implementation, the processing units used for channel estimation may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein. The software codes may be stored in memory unit and executed by the processors 1090 and 1050.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes exemplary embodiments. It is, of course, not possible to describe every conceivable combination of components or methodologies for purposes of describing the embodiments, but one of ordinary skill in the art may recognize that many further combinations and permutations are possible. Accordingly, these embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method to process wireless data packets, comprising:
   determining a subset of data bits to be processed at a wireless transmitter;
   employing a clock edge to store the data;
   mapping at least two bits from the subset of data bits into an interleaver memory per a given clock edge, including addressing at least two locations and writing the at least two bits to the at least two addressed locations.

2. The method of claim 1, further comprising transmitting the data bits as part of a forward link only wireless transmission.

3. The method of claim 1, further comprising generating the subset of data bits from at least one encoder.

4. The method of claim 1, further comprising mapping the at least two data bits as a set of constellation symbols.

5. The method of claim 1, further comprising generating a matrix having rows and columns for processing the data bits.

6. The method of claim 5, further comprising interchanging the columns in the matrix.

7. The method of claim 6, further comprising processing at least two bits within the matrix per a rising edge or a trailing edge of a clock.

8. A method to process wireless data packets, comprising:
   determining a subset of data bits to be processed at a wireless transmitter;
   employing a clock edge to store the data;
   mapping at least two bits from the subset of data bits into an interleaver memory per a given clock edge; and
   determining if the subset of data bits are divisible by a constant.

9. The method of claim 8, wherein the constant is eight.

10. The method of claim 8, further comprising performing alternative machine operations if the subset of data bits is not divisible by the constant.

11. A method to process wireless data packets, comprising:
    determining a subset of data bits to be processed at a wireless transmitter;
    employing a clock edge to store the data; and
    mapping at least two bits from the subset of data bits into an interleaver memory per a given clock edge, including addressing at least two locations in at least two memory banks, respectively, and writing the at least two bits to the at least two addressed locations, respectively.

12. The method of claim 11, further comprising receiving a data input, an address input, or a chip select input for the memory banks.

13. The method of claim 11, further comprising writing to the memory banks respective portions of a data packet.

14. The method of claim 11, further comprising generating at least one of a bank 0 write state, a bank 1 write state, a bank 2 write state, and a bank 4 write state.

15. The method of claim 14, further comprising generating at least one additional state for non-divisible data packets.

16. The method of claim 11, further comprising generating an address sequence for the memory banks.

17. The method of claim 11, further comprising generating a bank 0 write operation and a bank 3 write operation on the same clock cycle and according to adjacent addresses.

18. The method of claim 11, further comprising generating a bank 1 write operation and a bank 2 write operation on a shared clock cycle and according to adjacent addresses.

19. The method of claim 11, further comprising generating a bank 0 write operation and a bank 3 write operation on a shared clock cycle and according to adjacent addresses.

20. The method of claim 11, further comprising configuring the memory banks to be read or written during a shared clock cycle.

21. A transmitter for a wireless network, comprising:
    at least two buffers to process bits output from a transmitter encoder;
    a clock to drive data cycles in the buffers; and
    a state engine that controls interleaving of said bits, said state engine configured to update the at least two buffers, respectively, with at least two of said bits during a shared cycle of the clock, at respective ones of at least two buffer locations addressed by the state engine.

22. The transmitter of claim 21, further comprising a data and an address component for the buffers.

23. The transmitter of claim 21, wherein the state engine further comprises a state to process data packets that are not divisible by an even number.

24. The transmitter of claim 21, wherein the state engine further comprises at least four states for the parallel interleaving process.

25. An apparatus for processing transmitter data in a wireless network, comprising:
    means for encoding a data packet;
    means for interleaving the data packet on a shared clock cycle, including means for addressing at least two locations in at least two memory banks, respectively, and means for writing at least two bits of the data packet to the at least two addressed locations, respectively; and
    means for mapping the data packet to a constellation for employment in a wireless transmission.

26. A machine readable medium having stored thereon executable instructions which cause at least one processor to:
    encode a data packet within a wireless transmitter station;
    employ a clock edge to store at least two bits of the data packet; and
    map the at least two bits from the data packet into an interleaver component per a shared clock edge, including updating at least two buffers, respectively, with the at least two bits, at respective ones of at least two buffer locations addressed by said at least one processor.

27. A processor that executes instructions for transmitting data in a wireless communication environment, the instructions causing the processor to:
    encode an orthogonal frequency division multiplexed (OFDM) broadcast packet; and
    interleave the OFDM broadcast packet, including storing at least two bits of the OFDM broadcast packet during a shared clock cycle of a state machine, including updating at least two buffers, respectively, with said at least two bits, at respective ones of at least two buffer locations addressed by said processor.

28. An apparatus for processing transmitter data in a wireless network, comprising:
    means for determining a subset of data bits to be processed at a wireless transmitter;
    means for employing a clock edge to store the data;
    means for mapping at least two bits from the subset of data bits into an interleaver memory per a given clock edge, including addressing at least two locations and writing the at least two bits to the at least two addressed locations.

29. The apparatus of claim 28, further comprising means for transmitting the data bits as part of a forward link only wireless transmission.

30. The apparatus of claim 28, further comprising means for generating the subset of data bits from at least one encoder.

31. The apparatus of claim 28, further comprising means for mapping the at least two data bits as a set of constellation symbols.

32. The apparatus of claim 28, further comprising means for generating a matrix having rows and columns for processing the data bits.

33. The apparatus of claim 32, further comprising means for interchanging the columns in the matrix.

34. The apparatus of claim 33, further comprising means for processing at least two bits within the matrix per a rising edge or a trailing edge of a clock.

35. A machine-readable medium having stored thereon executable instructions which cause at least one processor to:
  determine a subset of data bits to be processed at a wireless transmitter;
  employ a clock edge to store the data;
  map at least two bits from the subset of data bits into an interleaver memory per a given clock edge, including address at least two locations and write the at least two bits to the at least two addressed locations.

36. The machine-readable medium of claim 35, further comprising executable instructions which cause at least one processor to transmit the data bits as part of a forward link only wireless transmission.

37. The machine-readable medium of claim 35, further comprising executable instructions which cause at least one processor to generate the subset of data bits from at least one encoder.

38. The machine-readable medium of claim 35, further comprising executable instructions which cause at least one processor to map the at least two data bits as a set of constellation symbols.

39. The machine-readable medium of claim 35, further comprising executable instructions which cause at least one processor to generate a matrix having rows and columns for processing the data bits.

40. The machine-readable medium of claim 39, further comprising executable instructions which cause at least one processor to interchange the columns in the matrix.

41. The machine-readable medium of claim 40, further comprising executable instructions which cause at least one processor to process at least two bits within the matrix per a rising edge or a trailing edge of a clock.

* * * * *